United States Patent
Wu et al.

(10) Patent No.: US 9,712,442 B2
(45) Date of Patent: Jul. 18, 2017

(54) EFFICIENT MEMORY BANDWIDTH UTILIZATION IN A NETWORK DEVICE

(71) Applicant: BROADCOM CORPORATION, Irvine, CA (US)

(72) Inventors: David Wu, San Diego, CA (US); Darren Duane Neuman, Palo Alto, CA (US); Flaviu Dorin Turean, Palo Alto, CA (US); Rajesh Shankarrao Mamidwar, San Diego, CA (US); Anand Tongle, San Diego, CA (US); Predrag Kostic, Burnaby (CA)

(73) Assignee: Broadcom Corporation, Irvine, CA (US)

( * ) Notice: Subject to any disclaimer, the term of this patent is extended or adjusted under 35 U.S.C. 154(b) by 417 days.

(21) Appl. No.: 14/072,744

(22) Filed: Nov. 5, 2013

(65) Prior Publication Data

US 2015/0085863 A1    Mar. 26, 2015

Related U.S. Application Data

(60) Provisional application No. 61/881,911, filed on Sep. 24, 2013.

(51) Int. Cl.

| H04L 12/879 | (2013.01) |
| H04L 12/861 | (2013.01) |
| H04L 12/747 | (2013.01) |

(52) U.S. Cl.
CPC ........ *H04L 45/742* (2013.01); *H04L 49/9042* (2013.01); *H04L 49/9047* (2013.01); *H04L 49/9078* (2013.01); *H04L 49/901* (2013.01)

(58) Field of Classification Search
None
See application file for complete search history.

(56) References Cited

U.S. PATENT DOCUMENTS

| 6,643,710 | B1 * | 11/2003 | Thorne | H04L 69/16 |
| | | | | 709/225 |
| 8,331,885 | B1 * | 12/2012 | Ben-Ari | 455/127.5 |
| 2001/0026557 | A1 * | 10/2001 | Gaedeken et al. | 370/442 |

(Continued)

*Primary Examiner* — Yaotang Wang
(74) *Attorney, Agent, or Firm* — McDermott Will & Emery LLP

(57) ABSTRACT

A system for efficient memory bandwidth utilization may include a depacketizer, a packetizer, and a processor core. The depacketizer may generate header information items from received packets, where the header information items include sufficient information for the processor core to process the packets without accessing the payloads from off-chip memory. The depacketizer may accumulate multiple payloads and may write the multiple payloads to the off-chip memory in a single memory transaction when a threshold amount of the payloads have been accumulated. The processor core may receive the header information items and may generate a single descriptor for accessing multiple payloads corresponding to the header information items from the off-chip memory. The packetizer may generate a header for each payload based at least on on-chip information and without accessing off-chip memory. Thus, the subject system provides efficient memory bandwidth utilization, e.g. at least by reducing the number of off-chip memory accesses.

21 Claims, 9 Drawing Sheets

(56) References Cited

U.S. PATENT DOCUMENTS

| | | | |
|---|---|---|---|
| 2001/0030959 A1* | 10/2001 | Ozawa | H04L 47/621 370/386 |
| 2003/0095558 A1* | 5/2003 | Chung | H04L 12/5693 370/417 |
| 2006/0075142 A1* | 4/2006 | Cornett et al. | 709/246 |
| 2006/0268913 A1* | 11/2006 | Singh | H04L 49/90 370/412 |
| 2007/0030911 A1* | 2/2007 | Yoon | 375/240.25 |
| 2008/0104313 A1* | 5/2008 | Chu | H04L 49/90 711/104 |
| 2008/0313687 A1* | 12/2008 | Rajakarunanayake | H04N 21/2343 725/110 |
| 2011/0096664 A1* | 4/2011 | Petry | G06F 15/16 370/231 |
| 2012/0314709 A1* | 12/2012 | Post | G06F 12/0802 370/392 |
| 2013/0163599 A1* | 6/2013 | Nozaki | 370/394 |

* cited by examiner

EFFICIENT MEMORY BANDWIDTH UTILIZATION IN A NETWORK DEVICE

CROSS-REFERENCE TO RELATED APPLICATIONS

The present application claims the benefit of U.S. Provisional Patent Application Ser. No. 61/881,911, entitled "Efficient Memory Utilization in a Network Device," filed on Sep. 24, 2013, which is hereby incorporated by reference in its entirety for all purposes.

TECHNICAL FIELD

The present description relates generally to memory utilization and, in particular, relates to efficient memory bandwidth utilization in a network device.

BACKGROUND

Network devices, such as home gateway devices, may include a general purpose host processor, and/or other associated hardware components, for both processing audio video (AV) traffic, such as audio streams, video streams, etc., and for processing non-AV traffic. For example, the host processor may receive AV traffic, decrypt the AV traffic and/or add encryption to the AV traffic, and forward the AV traffic to a computing device operably connected to the gateway device, for example, via a local area network. In addition to performing these actions, the host processor may also process non-AV traffic that is transmitted over the local area network. Accordingly the host processor may negotiate multiple incoming and outgoing network connections, including determining whether traffic transmitted via each network connection should be encrypted or decrypted, encrypting and/or decrypting AV traffic, routing and/or responding to non-AV traffic, and tearing down each network connection when the network connection has been terminated. Furthermore, the host processor may process the traffic uniformly, e.g. in the same manner, irrespective of whether the traffic is AV traffic or non-AV traffic.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
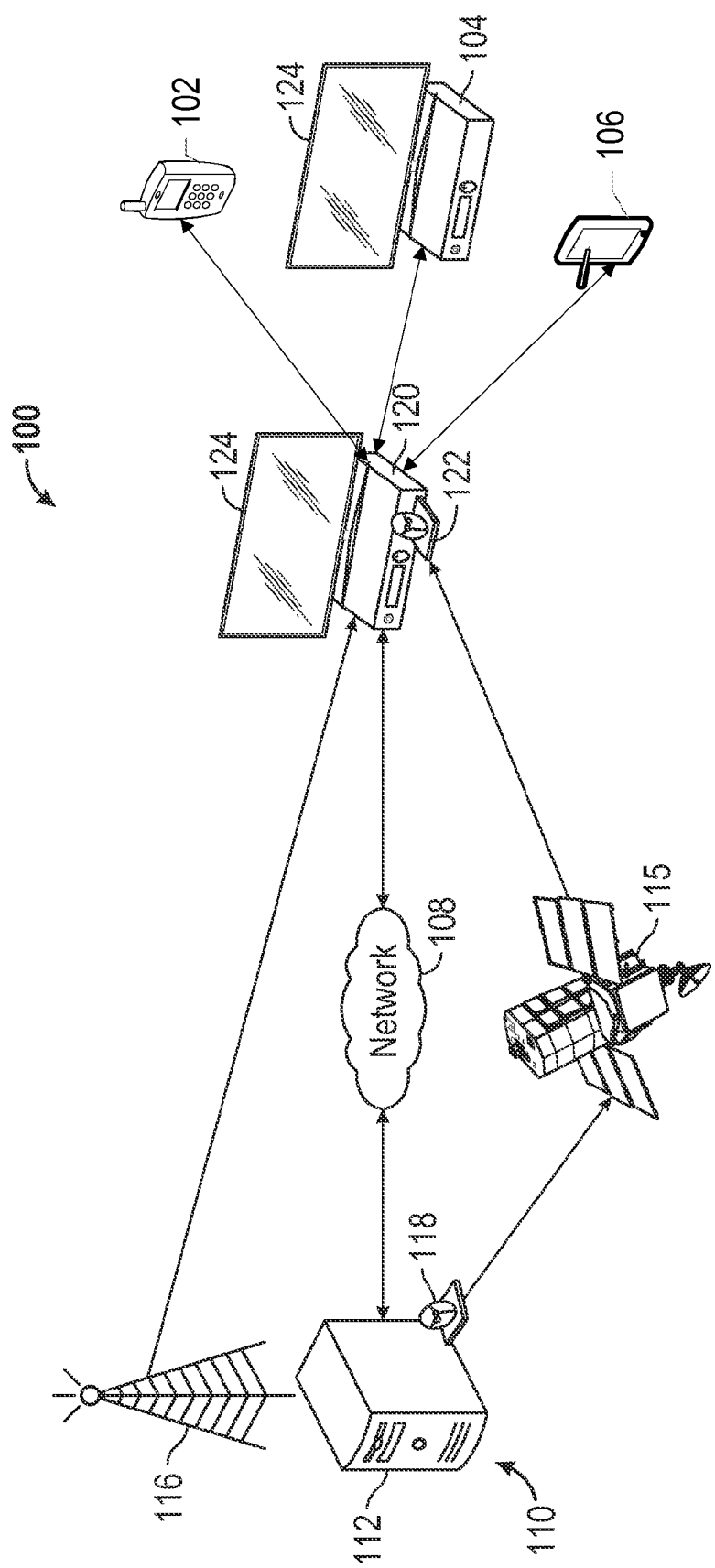
FIG. 1 illustrates an example network environment in which a system for efficient memory bandwidth utilization in a network device may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for efficient memory bandwidth utilization in a network device, a network device, such as a gateway device, may include a dedicated processor along with associated hardware and/or firmware that exclusively processes AV traffic transmitted through the gateway device. In one or more implementations, the dedicated processor and associated hardware and/or firmware may collectively be referred to as an AV stream processor, an advanced stream processor (ASP), and/or a stream processor. Accordingly, the AV stream processor of the gateway device may be specifically configured to process AV traffic, for example based on one or more attributes and/or characteristics of AV traffic, which may provide for more efficient memory bandwidth utilization for AV traffic processing than may be achievable by the host processor, and may thereby reduce the latency associated therewith.

In the subject system, an AV stream processor of a network device may utilize on-chip memory, such as static random-access memory (SRAM), to aggregate multiple off-chip memory transactions, such as dynamic random-access memory (DRAM) transactions, into a single larger off-chip memory transaction. For example, the AV stream processor may aggregate extracted header information items and payloads of received packets in on-chip buffers, and may then write aggregated header information items and/or aggregated payloads to off-chip memory in a single large memory transaction sizes. Thus, the number of off-chip memory transactions can be reduced, thereby decreasing the latency associated with processing the AV traffic. Furthermore, when the header information items and the payloads are independently aggregated and written to the off-chip memory, the AV stream processor may implement a data coherence mechanism to ensure that a payload has been written to the off-chip memory before the corresponding header is processed.

The AV stream processor may also utilize on-chip memory (rather than off-chip memory) to buffer and/or provide one or more data items that are used in processing AV traffic, such as descriptors, static header information, acknowledgement (ACK) packets, and the like. Since on-chip memory may generally be associated with lower latency than off-chip memory, the use of on-chip memory may reduce the latency of processing the AV traffic. Furthermore, since the AV traffic may be deterministic, the AV stream processor may be able to determine the maximum amount of on-chip memory required to process the AV traffic, thereby ensuring that the network device does not include unutilized on-chip memory. Thus, the subject system may provide for efficient memory bandwidth utilization in a network device by reducing the number of off-chip memory accesses by aggregating off-chip memory transactions in on-chip memory and by efficiently utilizing on-chip memory, rather than off-chip memory, to buffer one or more data items used for AV traffic processing.

FIG. 1 illustrates an example network environment 100 in which a system for efficient memory bandwidth utilization in a network device may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to a network device 120, such as by a network 108. In one or more implementations, the network environment 100 may further include one or more electronic devices 102, 104, 106 that are communicably coupled to the network device 120. The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include one or more transmission networks, such as a coaxial transmission network, a fiber optic transmission network, or generally any transmission network that communicatively couples the content server 112 and the network device 120.

The CDN 110 may include, and/or may be communicably coupled to, a content server 112, an antenna 116 for transmitting AV streams, such as via multiplexed bitstreams, over the air, and a satellite transmitting device 118 that transmits AV streams, such as via multiplexed bitstreams to a satellite 115. The network device 120 may include, and/or may be coupled to, a satellite receiving device 122, such as a satellite dish, that receives data streams, such as multiplexed bitstreams, from the satellite 115. In one or more implementations, the network device 120 may further include an antenna for receiving data streams, such as multiplexed bitstreams over the air from the antenna 116 of the CDN 110. The content server 112 and/or the network device 120, may be, or may include, one or more components of the electronic system discussed below with respect to FIG. 9.

In one or more implementations, any network data transmissions that include AV streams and/or AV data, and/or are associated with AV streams and/or AV streaming data, such as acknowledgments for AV streams, may be referred to as AV traffic (or AV network traffic). Similarly, any network data transmissions that do not include, and/or are not associated with, AV streams and/or AV data, may be referred to as non-AV traffic (or non-AV network traffic).

The electronic devices 102, 104 and 106 can be computing devices such as laptop or desktop computers, smartphones, personal digital assistants ("PDAs"), portable media players, set-top boxes, tablet computers, televisions or other displays with one or more processors coupled thereto and/or embedded therein, or other appropriate computing devices that can be used for receiving, decoding, and presenting AV programs and/or can be coupled to such a device. In the example of FIG. 1, electronic device 102 is depicted as a smart phone, electronic device 104 is depicted as a set-top box, and electronic device 106 is depicted as a tablet device. In one or more implementations, any of electronic devices 102, 104, 106 may be referred to as a user device or a client device. For example, the electronic device 104 and the network device 120 may both be set-top boxes and the electronic device 104 may operate as a client device of the network device 120.

The network device 120 may include, or may be coupled to, memory, a host processor for processing non-AV traffic, and a dedicated network traffic processor, along with associated hardware/firmware, that exclusively processes AV traffic, e.g. an AV stream processor, an AV processor or a stream processor. The network device 120 may also include a switch device that is configurable to route non-AV traffic to the host processor and AV traffic to the AV stream processor. Thus, in network device 120, AV traffic processing by the AV stream processor is decoupled from non-AV traffic processing by the host processor. In one or more implementations, the host processor, the AV stream processor, and/or the switch device may be co-located, e.g. on the same semiconductor chip, the same integrated circuit, and/or the same printed circuit board (PCB).

In one or more implementations, the network device 120 may also be, or may also include, a set-top box, e.g. a device that is coupled to, and is capable of presenting AV programs on, an output device 124, such as a television, a monitor, speakers, or any device capable of presenting AV programs. In one or more implementations, the network device 120 may be integrated into the output device 124. The network device 120 may receive AV streams from the content server 112, such as multiplexed bitstreams, that include AV programs, such as television programs, movies, or generally any AV content. The network device 120 may receive the AV streams from the content server 112 via the antenna 116, via the network 108, and/or via the satellite 115.

In the example network environment 100 of FIG. 1, the network device 120 is configured to couple the electronic devices 102, 104, 106 to the content server 112 and/or to the network 108, e.g. by using the aforementioned switch device. In one or more implementations, the electronic devices 102, 104, 106 may be coupled to the network device 120 via a local area network. In one or more implementations, the network device 120 may be referred to as a gateway device. For example, the network device 120 may receive requests for AV traffic, via the switch device, from the electronic devices 102, 104, 106 and may forward the requests, via the switch device, to the content server 112. In response to the requests, the network device 120 may receive, via the switch device, AV traffic from the content server 112 and may forward the AV traffic, via the switch device, to one or more of the electronic devices 102, 104, 106. In one or more implementations, the network device 120 may receive and/or retrieve AV streams via one or more local AV sources, such as a local hard drive and/or one or more local AV tuners, and may provide the AV streams to one or more of the electronic devices 102, 104, 106. For example, the electronic devices 102, 104, 106 may record AV programs on the local hard drive of the network device 120. The network device 120 may packetize and/or otherwise process AV streams received/retrieved from local AV sources and may provide the packetized AV data to the electronic devices 102, 104, 106 via the switch device.

Figure 2:
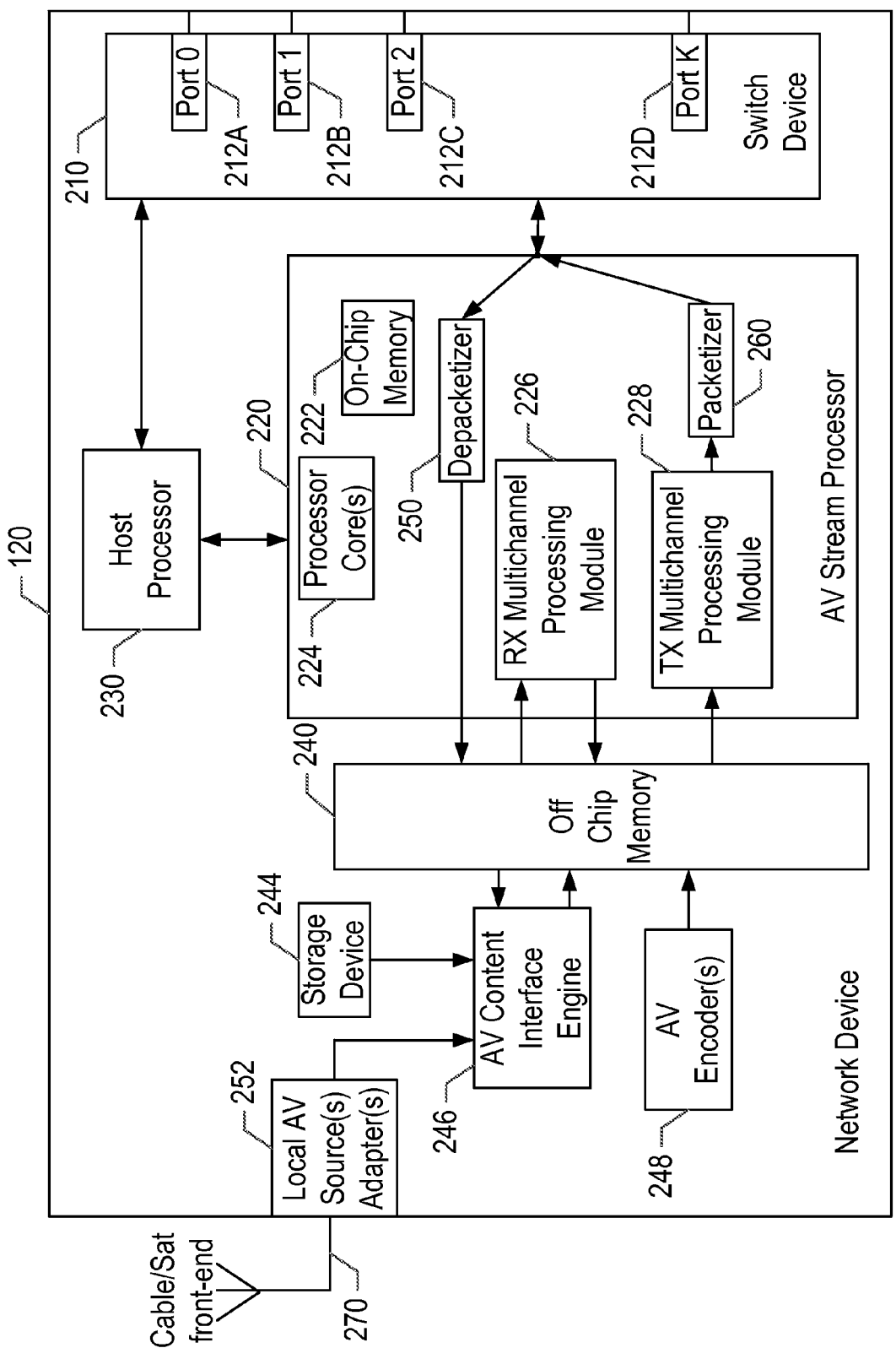
FIG. 2 illustrates an example network device implementing a system for efficient memory bandwidth utilization in a network device in accordance with one or more implementations.

FIG. 2 illustrates an example network device 120 implementing a system for efficient memory bandwidth utilization in a network device in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The network device 120 includes a switch device 210, an AV stream processor 220, a host processor 230, off-chip memory 240, a storage device 244, an AV content interface engine 246, one or more AV encoders 248, one or more local AV source adapters 252, and a cable/satellite front end 270. The cable/satellite front end 270 may include the satellite receiving device 122, and one or more other devices and/or connections for receiving AV content via a coaxial transmission network, via satellite, via antenna, and/or via any other transmission network. The switch device 210 may include one or more ports 212A-D that may be coupled to one or more physical network ports, such as an Ethernet port, a multimedia over coax alliance (MoCA) port, reduced gigabit media independent interface (RGMII) port, and the like.

The AV stream processor 220 may include on-chip memory 222, a processor core 224, a receive (RX) multichannel processing module 226, a transmit (TX) multichannel processing module 228, a depacketizer 250, and a packetizer 260. The processor core 224 may be and/or may include one or more general purpose processors, microprocessors, controllers, or any other central processing units (CPUs). In one or more implementations, the processor core 224 may execute configurable firmware that performs one or more operations described herein. However, for explanatory purposes, the operations performed by the firmware are described herein as being performed by the processor core 224.

The on-chip memory 222 may be, or may include, one or more memory modules, such as random access memory (RAM), static random access memory (SRAM), and/or any other suitable memory modules. For explanatory purposes, the on-chip memory 222 is illustrated as a single block; however, the on-chip memory 222 may be several separate individual modules and/or several separate partitions of one or more memory modules. In one or more implementations, the on-chip memory 222 may be referred to as "on-chip" because the memory modules of the on-chip memory 222 may be on the same semiconductor chip as the AV stream processor 220. In one or more implementations, one or more of the memory modules of the on-chip memory 222 may be on the same semiconductor chip and/or the same integrated circuit as the depacketizer 250, the packetizer 260, the RX multichannel processing module 226 and/or the TX multichannel processing module 228.

In one or more implementations, the depacketizer 250, the packetizer 260, the RX multichannel processing module 226 and/or the TX multichannel processing module 228, may be implemented in software (e.g., subroutines and code). In one or more implementations, the depacketizer 250, the packetizer 260, the RX multichannel processing module 226 and/or the TX multichannel processing module 228 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

The off-chip memory 240 may be, or may include, one or more memory modules, such as dynamic random-access memory (DRAM), double data rate synchronous dynamic random-access memory (DDR SDRAM), and/or any other suitable memory modules. For explanatory purposes, the off-chip memory 240 is illustrated as a single block; however, the off-chip memory 240 may be, and/or may include, several separate individual memory modules, or several separate partitions of one or more memory modules. In one or more implementations, the off-chip memory 240 may be referred to as "off-chip" because the memory modules of the off-chip memory 240 may be on a separate semiconductor chip than the AV stream processor 220 and the components thereof, e.g. the memory modules of the off-chip memory 240 may be external to the AV stream processor 220 and consequently the components thereof. In one or more implementations, the off-chip memory 240 may be on the same PCB, or a different PCB, as the AV stream processor 220.

The AV encoders 248 may transcode or otherwise encode AV streams, e.g. for transmission to one or more of the electronic devices 102, 104, 106. The storage device 244 may be, or may include, a non-volatile storage medium, such as a hard drive, and may store one or more AV programs, such as AV programs received by the network device 120. The local AV source adapters 252 may be one or more adapters configured to receive AV streams over one or more local AV connections, such as satellite, coaxial, etc. For example, the local AV source adapters 252 may include one or more tuners for receiving multiplexed bitstreams over satellite, coaxial, etc. The local AV source adapters 252 may also process received streams, such as demultiplexing multiplexed bitstreams, to access the individual AV streams and/or transport stream packets. The AV content interface engine 246 aggregates the AV streams received via the switch device 210, e.g. from the content server 112, and the AV stream received from coaxial or satellite connections, e.g. via local AV source adapters 252, and/or stored on the storage device 244. The AV content interface engine 246 then stores the transport stream packets in the off-chip memory 240, e.g. without encryption, for transmission to the electronic devices 102, 104, 106, and/or for presentation via a local output device 124.

The host processor 230 may be a general purpose processor of the network device 120. The host processor 230 and the AV stream processor 220 may be communicatively coupled to one another, for example, via a transmission line. The switch device 210 may include suitable circuitry and/or logic for routing network traffic, such as AV traffic and non-AV traffic, to one or more components of the network device 120, such as the host processor 230 and/or the AV stream processor 220.

The host processor 230 and/or the AV stream processor 220 may individually be associated with a port on the switch device 210. For example, the AV stream processor 220 may be associated with a first port and the host processor 230 may be associated with a second port that is distinct from the first port. The switch device 210 may be configured to route communications received from, and/or transmitted to, a communicably connected device, such as one or more of the electronic devices 102, 104, 106 and/or the content server 112, to either port and consequently to either of AV stream processor 220 or host processor 230. In one or more implementations, when the host processor 230 and/or the AV stream processor 220 is transmitting non-AV traffic or AV traffic, respectively, via the switch device 210, the ports of the switch device 210 that are associated with the host processor 230 and/or the AV stream processor 220 may be logically referred to as ingress ports, and the ports 212A-D of the switch device 210 may be logically referred to as egress ports.

In one or more implementations, the AV streams processed by the AV stream processor 220, and consequently the packets containing the AV streams, may each be associated with a separate channel, and/or one or more AV streams may be associated with the same channel. In one or more implementations, each device transmitting AV traffic to the network device 120, such as the content server 112, may be associated with a separate channel, and each device to which the network device 120 is transmitting AV traffic, such as the electronic devices 102, 104, 106, may be associated with a separate channel. In one or more implementations, the channel corresponding to a given packet may be identified by a tag carried in the header of the packet, based on a source network address identified in the header of the packet, and/or based on a destination network address identified in the header of the packet. For example, the header may include a class identifier that is mapped to one of the channels. In one or more implementations, the processor core 224 may store a lookup table, e.g. in the on-chip memory 222, that maps one or more of the aforementioned parameters, or any parameters determinable from a received packet, to each channel.

The depacketizer 250 may extract at least of portion of the headers from the packets based at least on the channels associated with the packets, e.g. based on header processing configuration information for each channel that is stored in the on-chip memory 222. The depacketizer 250 may generate a header information item from each extracted header. A header information item may be a data structure that includes information extracted from the header of the packet that may be utilized by the processor core 224 to process/route the packet without accessing the corresponding payload, e.g. in the off-chip memory 240. In this manner, the number of accesses to the off-chip memory 240 by the processor core 224 can be reduced, thereby providing efficient memory bandwidth utilization. The header information may also include the size of the payload of the packet, and memory location information for accessing the payload in the off-chip memory 240, e.g. the starting address at which the payload will be stored in the off-chip memory 240. For example, the off-chip memory 240 may be separately partitioned for each channel, e.g. using ring buffers, such that the depacketizer 250 can determine the starting address in the off-chip memory 240 that a payload will be written to, e.g. based on the order in which the payloads are received.

The depacketizer 250 may store the header information items in the on-chip memory 222 or the off-chip memory 240. If the header information items are stored in the off-chip memory 240, the combined extracted header information items from multiple packets associated with one or more channels in the order received may be accumulated, e.g. in on-chip memory 222, and then stored in the off-chip memory 240 in a single large memory transaction size, and may be read back from the off-chip memory 240 in a single large memory transaction size. In this manner, the number of memory accesses for writing/reading the header information items to/from the off-chip memory 240 can be reduced, e.g. as opposed to writing/reading every header information item individually to/from the off-chip memory 240, thereby providing efficient memory bandwidth utilization.

The depacketizer 250 may buffer the payloads of the packets in the off-chip memory 240. The payloads for each channel are stored separately in individual ring buffers of the off-chip memory 240. In one or more implementations, the payloads for the same channel are accumulated, e.g. in on-chip memory 222, and are then stored in the off-chip memory 240 in a single large memory transaction size, thereby providing efficient memory bandwidth utilization, e.g. based at least on the starting addresses that were included in the corresponding header information. In this manner, in each ring buffer associated with each channel, the payloads from consecutive packets are continuous in most cases when the received packets are not reordered. Thus, the payloads can later be read continuously in a single large memory transaction size, thereby providing efficient memory bandwidth utilization, as is discussed further below. Accordingly, the number of memory accesses for writing/reading the payloads to/from the off-chip memory 240 can be reduced, e.g. as opposed to writing/reading each payload individually to the off-chip memory 240, thereby providing efficient memory bandwidth utilization.

After writing the header information items and the payloads to the off-chip memory 240 in single large memory transaction sizes, thereby providing efficient memory bandwidth utilization, the depacketizer 250 passes the header information items to the processor core 224 for processing, in the order that the corresponding packets were received. An example depacketizer 250 is discussed further below with respect to FIGS. 3 and 5, and an example depacketizing process is discussed further below with respect to FIG. 6.

The depacketizer 250 may also implement a data coherence mechanism to ensure that the payload of a given packet is stored in the off-chip memory 240 before the header information item for the packet is passed to the processor core 224 for processing. In one or more implementations, the depacketizer 250 may buffer the header information items in the on-chip memory 222, and may write multiple header information items to the off-chip memory 240 in a single large memory transaction size, similar to the payloads. Thus, in this manner the number of memory writes for writing the header information items to the off-chip memory 240 can be reduced, e.g. as opposed to writing every header information item individually to the off-chip memory 240, thereby providing efficient memory bandwidth utilization. The depacketizer 250 may subsequently retrieve the header information items from the off-chip memory 240, and may perform the data coherence verification on the header information items, in the order that the corresponding packets were received, before providing the header information items to the processor core 224 for processing. An example data coherence process of an example depacketizer 250 is discussed further below with respect to FIG. 8.

The processor core 224 may process a packet by processing the header information item for the packet, e.g. without accessing the corresponding payload in the off-chip memory 240 (in most cases), and may generate a descriptor based at least on the header information item. Since processor core 224 processes the packet without accessing the corresponding payload in the off-chip memory 240, the number of accesses to the off-chip memory 240 is reduced, thereby providing efficient memory bandwidth utilization. If the payloads for a given channel are received in the correct order, and are consequently continuously stored to the ring buffer associated with the channel in the off-chip memory 240, e.g. in single large memory transaction sizes, the processor core 224 may process the header information items for multiple packets in aggregate and may generate a single descriptor for multiple payloads. Since the descriptors are stored in the on-chip memory 222, as is discussed further below, the amount of the on-chip memory 222 used to store the descriptors can be reduced by utilizing only one descriptor for multiple payloads, as opposed to utilizing one descriptor for each payload, thereby providing efficient utilization of the on-chip memory 222.

The processor core 224 may then provide the descriptor to the RX multichannel processing module 226 and/or the TX multichannel processing module 228. For example, if multiple continuous payloads contain AV data, the processor core 224 may generate a descriptor for accessing the multiple payloads in the off-chip memory 240, e.g. in a single large memory transaction size, thereby providing efficient memory bandwidth utilization, and may store the descriptor in on-chip memory 222 that is associated with the RX multichannel processing module 226. The RX multichannel processing module 226 may retrieve the descriptor from the on-chip memory 222, may retrieve the multiple payloads from the off-chip memory 240, e.g. in a single large memory transaction size, thereby providing efficient memory bandwidth utilization, and may process the payload and/or provide the payload for further processing, e.g. to the AV encoders 248 and/or the AV content interface engine 246. In one or more implementations, the depacketizer 250 and/or the RX multichannel processing module 226, may remove one or more security mechanisms from the received packet and/or payload, such as by decrypting the received packet and/or payload.

If the processor core 224 determines that an acknowledgment packet should be transmitted for the header information item, the processor core 224 generates a descriptor that includes acknowledgment information for generating an acknowledgment packet, such as an acknowledgment number, and stores the descriptor in on-chip memory 222 that is associated with the TX multichannel processing module 228. The TX multichannel processing module 228 may retrieve the descriptor from the on-chip memory 222 and may pass the descriptor to the packetizer 260 for generation of the acknowledgment packet. In one or more implementations, the processor core 224 may generate a descriptor that includes acknowledgment information for generating an acknowledgment packet that corresponds to several received header information items. For example, the acknowledgment information may be the highest acknowledgment number associated with the several received header information items. Thus, acknowledgment packets may be generated without accessing the off-chip memory 240, thereby providing efficient memory bandwidth utilization.

Once one or more payloads, such as one or more AV payloads, are ready to be prepared for transmission, the processor core 224 may store a descriptor associated with the one or more payloads in on-chip memory 222 associated with the TX multichannel processing module 228. The TX multichannel processing module 228 retrieves the descriptors from the on-chip memory 222, retrieves the corresponding one or more payloads (if any) from the off-chip memory 240, e.g. in single large memory transaction sizes, thereby providing efficient memory bandwidth utilization, appends a tag to the payload and/or descriptor that is indicative of the channel associated with the payload and/or descriptor, and passes the payload and/or descriptor to the packetizer 260.

Before transmission begins for each channel, the processor core 224 may store static header information in the on-chip memory 222 associated with the packetizer 260, such as channel configuration memory. When the packetizer 260 receives payload information, such as a payload and/or a descriptor, for packetizing, the packetizer 260 retrieves the static headers for the channel associated with the payload information (e.g. as indicated by an appended tag) from the on-chip memory 222, generates, on-chip, dynamic header information for the payload, such as sequence number, etc., modifies the static headers to include the dynamic header information, inserts the headers and the payload into a packet, such as an Ethernet packet, and provides the Ethernet packet to the switch device 210 for transmission to a device, such as the content server 112, and/or one or more of the electronic devices 102, 104, 106. Thus, the packetizer 260 generates the header for the packets on-chip, without accessing the off-chip memory 240, thereby providing efficient memory utilization. In one or more implementations, some parameters in the regular header or new optional headers can be dynamically sent by the processor core 224 through the TX multichannel processing module 228 to the packetizer 260. In one or more implementations, the TX multichannel processing module 228 and/or the packetizer 260 may implement a security mechanism with respect to the payload and/or packet, such as by encrypting the payload and/or packet. An example packetizer 260 is discussed further below with respect to FIG. 4, and an example packetizing process is discussed further below with respect to FIG. 7.

Figure 3:
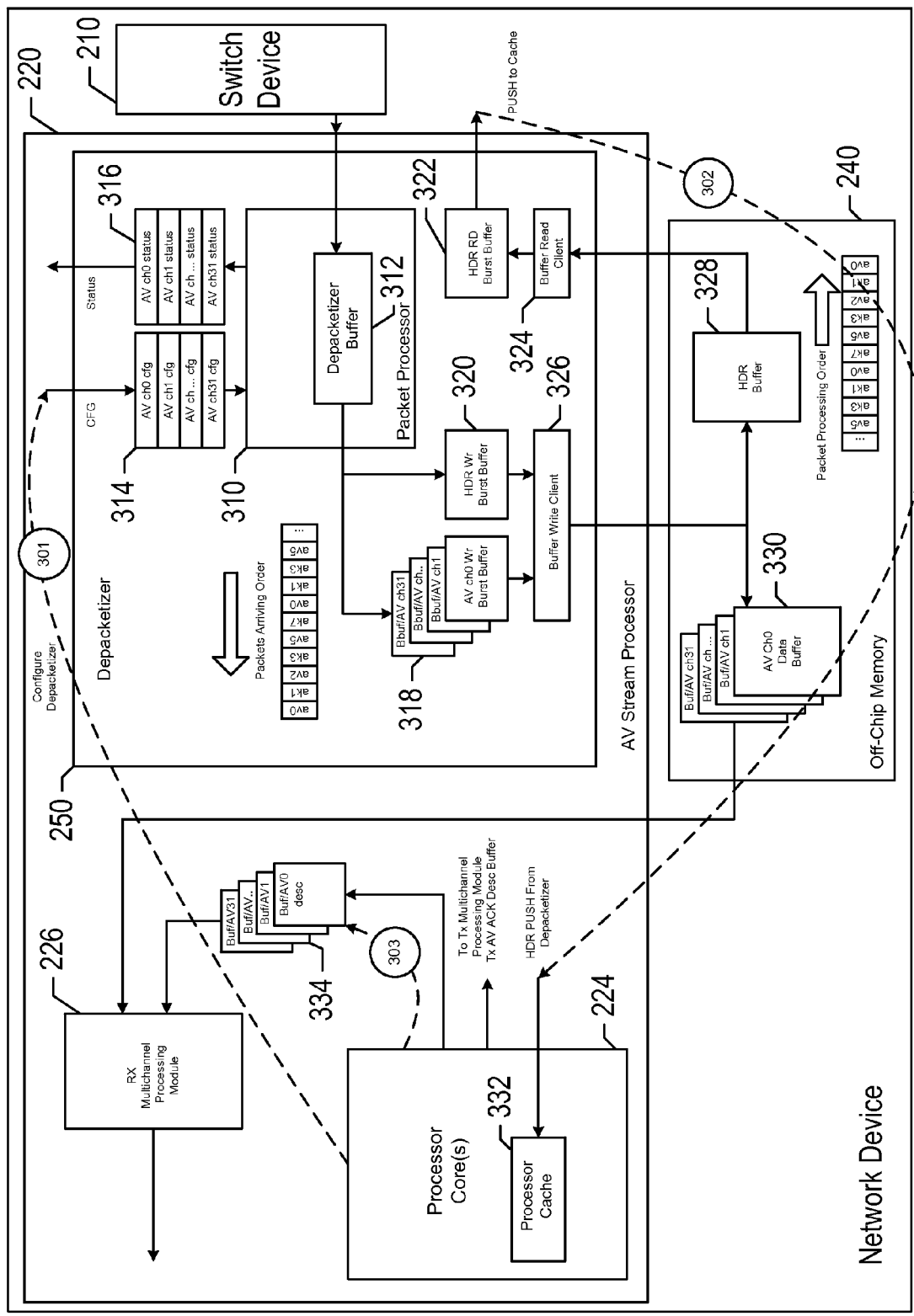
FIG. 3 illustrates an example depacketizer of an example network device implementing a system for efficient memory bandwidth utilization in a network device in accordance with one or more implementations.

FIG. 3 illustrates an example depacketizer 250 of an example network device 120 implementing a system for efficient memory bandwidth utilization in a network device in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network device 120 includes the switch device 210, the AV stream processor 220, and the off-chip memory 240. The AV stream processor 220 includes the processor core 224, the RX multichannel processing module 226, RX multichannel processing module buffers 334, and the depacketizer 250. In one or more implementations, the RX multichannel processing module buffers 334 may be stored in the on-chip memory 222 of the AV stream processor 220. The processor core 224 includes a processor cache 332, such as a tightly coupled memory. The depacketizer 250 includes a packet processor 310, a depacketizer buffer 312, a channel configuration buffer 314, a channel status buffer 316, payload write burst buffers 318, header burst buffer 320, a buffer write client 326, a buffer read client 324, and header read burst buffer 322. The off-chip memory 240 may include payload buffers 330 and header buffer 328.

In one or more implementations, one or more of the buffers 312, 314, 316, 318, 320, 322, 334 may be stored in on-chip memory 222 of the AV stream processor 220. In one or more implementations, one or more of the buffers 312, 314, 316, 318, 320, 322, may be stored in an on-chip memory module that is on the same semiconductor chip as the depacketizer 250, but not on the same semiconductor chip as the AV stream processor 220, e.g. if the depacketizer 250 is implemented via a separate integrated circuit that is mounted onto an integrated circuit that contains the AV stream processor 220.

In one or more implementations, the buffers 318, 330, 334 may each include a separate ring buffer for storing information corresponding to each channel, such as payloads, AV data, and/or descriptors, and the buffer 320 may be a ring buffer. In one or more implementations, the AV stream processor 220 may service any number of channels, such as 32, 64, etc. In one or more implementations, the buffers 318, 330 may be configured to store entire Ethernet frames in the ring buffers. In one or more implementations, acknowledgment packets for all of the channels may be stored in a single ring buffer for one or more of buffers 318, 330, 334. In one or more implementations, the buffers 318, 320 may share one combined buffer with multiple slots (smaller than the burst size) per channel in the on-chip memory 222 for burst buffering. The payload write burst buffers 318 may be dynamically allocated with one or more slots as needed.

The buffer write client 326 may arbitrate write memory transactions to the off-chip memory 240 from the buffers 318, 320 corresponding to the input channels and the header information items. In one or more implementations, the individual payload write burst buffers 318 may accumulate payloads from consecutive packets of the same channel until a large transaction size is reached, such as a threshold transaction size, and then the accumulated payloads are written to the payload buffer 330 associated with the channel in the off-chip memory 240 in a single large transaction size, thereby providing efficient memory bandwidth utilization. The header burst buffer 320 accumulates the header information items from consecutive packets across all of the input channels in the received order until a large transaction size is reached, e.g. a threshold transaction size, and then the accumulated header information items are written to the header buffer 328 in a single large memory transaction size, thereby providing efficient memory bandwidth utilization. In this manner, bandwidth of the buffer write client 326 can be reduced to be close to the actual input rate of the input channels combined, thereby providing efficient memory bandwidth utilization. For example, the bandwidth of the buffer write client 326 may be approximately 1 Gigabit/second (Gbit/s) for a combined input data rate of approximately 1 Gbit/s.

The buffer read client 324 may retrieve header information items from the header buffer 328 of the off-chip memory 240, e.g. multiple header information items in a single large memory transaction size thereby providing efficient memory bandwidth utilization, and may store the header information items in the header read burst buffer 322. The depacketizer buffer 312 may be used by the depacketizer 250 for flow/delay control, e.g. by buffering incoming packets received from switch device 210. In one or more implementations, a single memory transaction may be referred to as a burst.

In operation, the processor core 224 stores configuration information for each channel in the channel configuration buffer 314 (301). In one or more implementations, the configuration information for a given channel is stored in the channel configuration buffer 314 before any packets are received by the depacketizer 250 for the channel. The channel configuration information may indicate, e.g., how the header of a packet associated with the channel should be extracted. For example, the configuration information may indicate particular parameters to extract in a regular header or in certain optional headers. The total extracted header size can be configurable, such as 32 bytes, 64 bytes, 96 bytes, 128 bytes, or generally any number of bytes. In one or more implementations, the header may include an internet protocol (IP) header, such as an IPv4 or an IPv6 header, and/or a transport header, such as a transmission control protocol (TCP) header, a user datagram protocol (UDP) header, a real-time transport protocol (RTP) header, or generally any transport header.

The depacketizer 250 may receive packets from the switch device 210 and the packet processor 310 of the depacketizer 250 may extract at least a portion of the headers from the received packets based at least in part on the configuration information of the channels associated with the packets. The depacketizer 250 may generate header information items from the extracted headers, where the header information items include one or more additional parameters, such as the size of the corresponding payloads and/or location information for accessing the corresponding payloads in the payload buffers 330 of the off-chip memory 240. In one or more implementations, the header information items may further include one or more of frame status information, header error status information, the class identifier (e.g. channel identifier), checksum information, payload length information and/or an arriving timestamp, such as a 32-bit timestamp. The header information items may generally include sufficient information for processing the packet by the processor core 224 without having to access the payload from the off-chip memory 240, thereby providing efficient memory bandwidth utilization.

The depacketizer 250 may then store the header information items in the header write burst buffer 320 in the order that the corresponding packets were received. The buffer write client 326 may write multiple header information items (e.g. entire header information items or partial header information items) to the header buffer 328 of the off-chip memory in a single large memory transaction size, thereby providing efficient memory bandwidth utilization, and in the order that the corresponding packets were received. For example, the buffer write client 326 may wait until a threshold amount of header information items are stored in the header write burst buffer 320 before writing the header information items to the off-chip memory 240.

Since the payload buffers 330 may include a separate ring buffer for each channel, the depacketizer 250 may be able to determine the starting address in the payload buffers 330 for a payload associated with any channel based at least on the starting address of the ring buffer for the associated channel, the size of, and/or number of memory slots in, the ring buffer for the associated channel, and the size of the payload. The starting address and/or size of the payload buffers 330 for each channel may be stored in the channel configuration buffer 314 for each channel, e.g. by the processor core 224. The depacketizer 250 may store the current starting address for each channel in a lookup table, such as in on-chip memory 222, and/or in the channel configuration buffer 314. Thus, the current starting address for each channel may be initialized as the starting address of the ring buffer of the payload buffers 330 for each channel, e.g. as stored in the channel configuration buffer 314. The depacketizer 250 may then use the size of each processed payload, e.g. as indicated by the extracted header corresponding to the payload, to determine the amount of memory space in the ring buffer that will be occupied by the payload, and consequently the starting address in the ring buffer for the next payload.

The packet processor 310 of the depacketizer 250 may store the payload of each packet in the ring buffer of the payload write burst buffers 318 corresponding to the channel associated with the payload, and in the order that the corresponding packets were received. In one or more implementations, the entire Ethernet frame (including IP and transport packet headers) may be stored in the payload write burst buffers 318, or the TCP/UDP/RTP data payload only may be stored in the payload write burst buffers 318. In the instance of TCP payloads, the TCP data may be continuous in the ring buffers of the payload write burst buffers 318 if no out of order packets are received. In the instance of acknowledgement packets, either no payload data, or the entire Ethernet frame, are stored in the payload write burst buffers 318. In one or more implementations, the payload size, e.g. the frame data size, may be configured to maximize the data burst size for off-chip memory 240 accesses, e.g. reads and retransmission writes.

The buffer write client 326 may write multiple payloads, e.g. from a payload write burst buffer 318 corresponding to a single channel or from different payload write burst buffers 318 corresponding to multiple channels, in a single large memory transaction size to the payload buffers 330 of the off-chip memory 240, thereby providing efficient memory bandwidth utilization by reducing the number of off-chip memory 240 accesses. For example, the buffer write client 326 may wait until a threshold amount of payloads have been stored in the payload write burst buffer 318 before writing the payloads to the off-chip memory 240. In one or more implementations, a single large memory transaction size performed by the buffer write client 326 may include only a portion of one or more payloads.

The buffer read client 324 may read multiple header information items from the header buffer 328 in a single large memory transaction size, thereby providing efficient memory bandwidth utilization by reducing the number of off-chip memory 240 accesses, and in the order that the corresponding packets were received. The header information items may be stored in the header read burst buffer 322. The depacketizer 250 may retrieve the header information items from the header read burst buffer 322, and if the corresponding payload has been stored in the off-chip memory 240, pass the header information item to the processor core 224, e.g. by storing the header information item in the processor cache 332 (302) and/or by allowing the processor core 224 to read the header information item from the header read burst buffer 322. If the corresponding payload has not been stored in the off-chip memory 240, the depacketizer 250 waits until the corresponding payload has been stored in the off-chip memory 240 before passing the header information item to the processor core 224, and/or before allowing the processor core 224 to read the header information item from the header read burst buffer 322. This data coherence mechanism is discussed in more detail below with respect to FIGS. 5 and 8.

Upon receiving the header information items, the processor core 224 generates a descriptor chain (e.g. linked list) for each of the channels. For example, the processor core 224 may retrieve multiple header information items from the processor cache 332 on a periodic basis, such as each clock cycle. The processor core 224 may then generate a single descriptor for multiple header information items corresponding consecutive payloads of the same channel. The descriptors may include, for example, information for accessing the consecutive payloads from the off-chip memory 240. The processor core 224 may store the descriptors for the channels in the ring buffers of the RX multichannel processing module buffers 334 corresponding to the channels (303). The RX multichannel processing module 226 may retrieve the descriptors for the channels from the RX multichannel processing module buffers 334, and may retrieve the corresponding payloads from the off-chip memory 240 for further processing. Since the processor core 224 generates a single descriptor for accessing multiple payloads, each descriptor covers a large amount of data, such as a large number of payloads, stored in the off-chip memory 240. Thus, only a few descriptors need to be stored in the RX multichannel processing module buffers 334 for a large amount of data, thereby reducing the amount of on-chip memory 222 required to store the descriptors and providing efficient memory utilization.

The processor core 224 may also generate acknowledgement information for one or more received packets, e.g. based on the corresponding header information items. For example, the processor core 224 may generate an updated acknowledgment number and/or an updated Timestamp Echo Reply (TSecr), may store the updated information in a descriptor and may provide the descriptor to the TX multichannel processing module 228 and/or the packetizer 260, e.g. by storing the descriptor in on-chip memory 222 associated with either.

In one or more implementations, the packet processor 310 may store status information pertaining to each channel in the channel status buffer 316. The channel status information may include, e.g., whether the channel is active/inactive, error status information for the channel, or generally any status information pertaining to the channel. In one or more implementations, the channel status buffer 316 may be read by the processor core 224, e.g. to determine when transmissions have ceased for a given channel and/or when transmissions are being initiated for a given channel.

Figure 4:
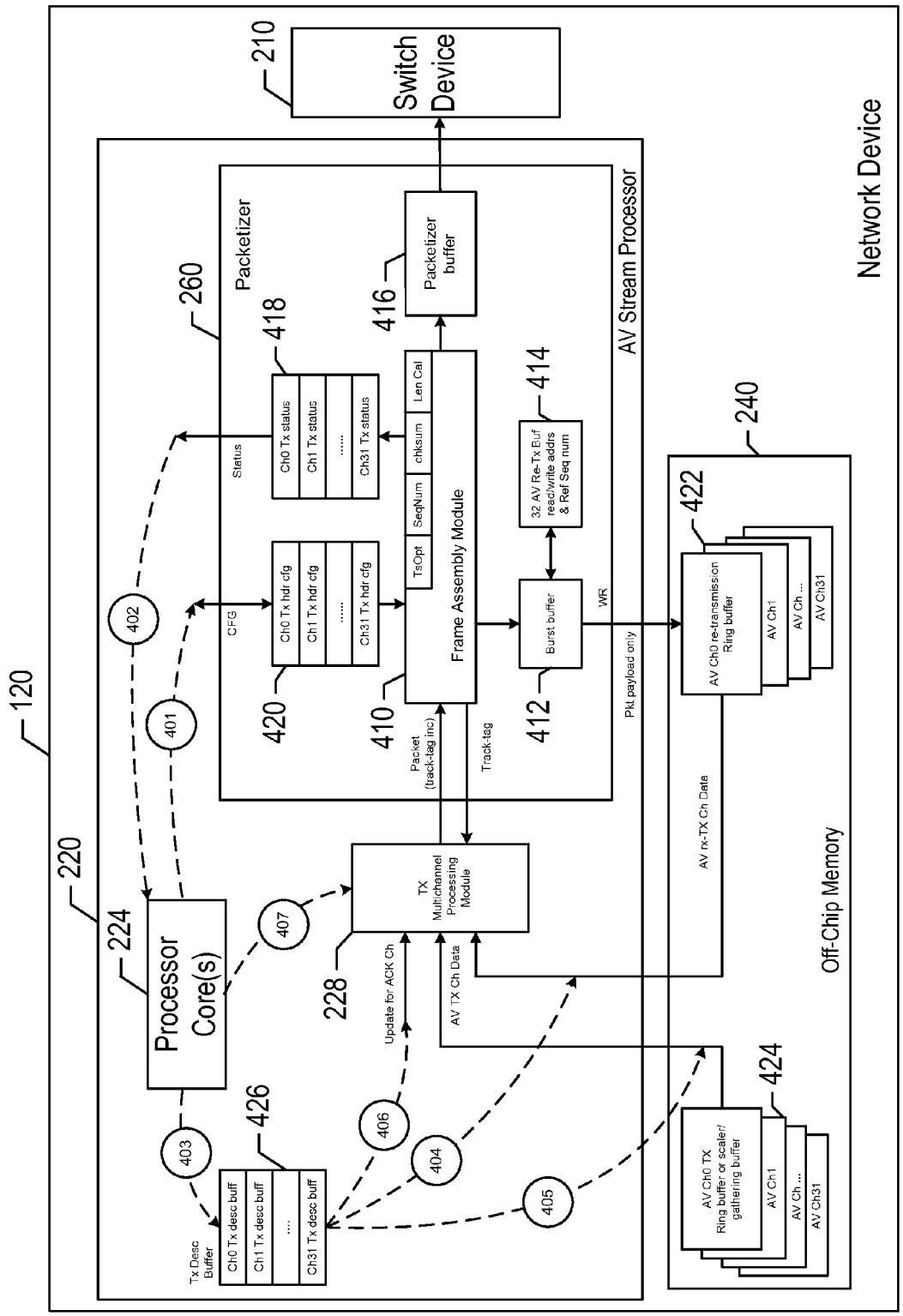
FIG. 4 illustrates an example packetizer of an example network device implementing a system for efficient memory bandwidth utilization in a network device in accordance with one or more implementations.

FIG. 4 illustrates an example packetizer 260 of an example network device 120 implementing a system for efficient memory bandwidth utilization in a network device in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network device 120 includes the switch device 210, the AV stream processor 220, and off-chip memory 240. The off-chip memory 240 includes payload buffers 424 and retransmission buffers 422. The AV stream processor 220 includes the processor core 224, the packetizer 260, the TX multichannel processing module 228, and TX multichannel processing module buffers 426. The packetizer 260 includes a frame assembly module 410, a burst buffer 412, a retransmission sequence number buffer 414, a packetizer buffer 416, a channel configuration buffer 420, and a channel status buffer 418.

In one or more implementations, one or more of the buffers 412, 414, 416, 418, 420, 426 may be stored in on-chip memory 222 of the AV stream processor 220. In one or more implementations, one or more of the buffers 412, 414, 416, 418, 420, may be stored in an on-chip memory module that is on the same semiconductor chip as the packetizer 260, but not on the same semiconductor chip as the AV stream processor 220, e.g. if the packetizer 260 is implemented via a separate integrated circuit that is mounted onto an integrated circuit that includes the AV stream processor 220. In one or more implementations, the buffers 422, 424, 426 may each include a separate ring buffer for storing information corresponding to each channel, such as payloads, AV data, and/or descriptors.

In operation, the processor core 224 stores configuration information for each channel in the channel configuration buffer 420 (401). In one or more implementations, the configuration information for a given channel is stored in the channel configuration buffer 420 before any packets are packetized by the packetizer 260 for the channel. The channel configuration information may indicate, e.g., header processing information for each channel, such as header processing commands, static Ethernet/IP/TCP headers for each channel, or any other information that may be used for framing, such as Ethernet framing, for each channel.

In one or more implementations, the frame assembly module 410 may store status information pertaining to each channel in the channel status buffer 418. The channel status information may include, e.g., whether the channel is active/inactive, error status information for the channel, retransmission information for the channel, or generally any status information pertaining to the channel. In one or more implementations, the channel status buffer 418 may be read by the processor core 224 (402), e.g. to determine when packets have been retransmitted for a given channel.

The processor core 224 may generate descriptors in conjunction with packetizing the AV traffic associated with the channels and may store the descriptors in the TX multichannel processing module buffers 426 corresponding to the channels (403). As previously discussed, since the payloads are stored continuously in the ring buffers for each channel in the off-chip memory 240, the processor core 224 can generate a single descriptor for a large amount of data, such as a large number of consecutive AV payloads for a given channel. In this manner, only a small number of descriptors are required for a large amount of data, thereby reducing the size of the TX multichannel processing module buffers 426 required to store the descriptors and providing efficient memory utilization.

The TX multichannel processing module 228 may retrieve the descriptors for the channels from the TX multichannel processing module buffers 426, and may process the descriptors accordingly, e.g. based at least on the contents of the descriptors. For example, a descriptor generated by the processor core 224 may include partially updated header information, such as an acknowledgment number, or extended header, or a descriptor may include a pointer for accessing a data buffer that includes all of the headers for an Ethernet frame (406). In one or more implementations, the partially updated header may only be inserted as a next descriptor after the previous descriptor is processed.

The processor core 224 may also generate one or more descriptors that include information for accessing AV channel data, such as one or more payloads, from the payload buffer 424 (405). For example, the descriptor may include a starting memory address of a first payload and the total size of the payloads. In one or more implementations, the AV channel data may be encrypted based at least on a security mechanism, such as digital transmission content protection, or DTCP. The AV channel data may be encrypted by the TX multichannel processing module 228 and/or a security module that receives unencrypted AV channel data from the TX multichannel processing module 228, encrypts the AV channel data in the order that it is received, and passed the encrypted AV channel data to the packetizer 260. In one or more implementations, one or more descriptors generated by the processor core 224 may include full port control protocol (PCP) headers, hypertext transfer protocol (HTTP) chunk headers, or generally any header information. The processor core 224 may also generate one or more descriptors that include information for accessing a payload, such as a retransmission TCP packet data payload, from one of the retransmission buffers 422 (404). In one or more implementations, the processor core 224 may configure the TX multichannel processing module 228 and/or may pass information, such as a descriptor, directly to the TX multichannel processing module 228 (407).

The TX multichannel processing module 228 may process the descriptors and may provide information corresponding to each descriptor to the frame assembly module 410 for generating a packet, e.g. an Ethernet frame, along with a tag that identifies the channel associated with the descriptor. For example, if the descriptor includes partially updated header information, or information for accessing all headers from a data buffer (406), the TX multichannel processing module 228 may provide the frame assembly module 410 with the partially updated header information, and/or all of the headers for the Ethernet frame. If the descriptor includes information for accessing multiple payloads from the payload buffers 424 (405), the TX multichannel processing module 228 may retrieve the multiple payloads from the payload buffers 424 in a single large memory transaction size, thereby providing efficient memory bandwidth utilization. The TX multichannel processing module 228 may process the payloads and may provide the frame assembly module 410 with encrypted AV channel data, e.g. PCP header in DTCP, clear AV channel data, and/or HTTP chunk header/data. In one or more implementations, the encryption may be performed by a separate block between the TX multichannel processing module 228 and the frame assembly module 410. If the descriptor includes information for accessing a retransmission payload from the retransmission buffers 422 (404), the TX multichannel processing module 228 may provide the frame assembly module 410 with the retransmission payload, e.g. retransmission TCP packet payload data.

The frame assembly module 410 may receive the tag and the information corresponding to each descriptor from the TX multichannel processing module 228, e.g. payload data, partially updated headers, etc., and may use the information to assemble an Ethernet frame. The frame assembly module 410 may utilize the tag to determine the channel associated with the information, and may retrieve the configuration information for the channel from the channel configuration buffer 420, such as header processing commands, static Ethernet/IP/TCP headers, etc. The frame assembly module 410 may generate/retrieve static headers for a packet based on the configuration information for the channel and may modify the static headers of the packet to include additional header information, such as sequence number, checksum, header/payload length, timestamp insertion, etc., e.g. by inserting the dynamic header information into the static headers. Thus, the frame assembly module 410 can generate the headers on-chip and without accessing the off-chip memory 240, thereby providing efficient memory bandwidth utilization. The frame assembly module may then copy any payload data received from the TX multichannel processing module 228 to the payload of the packet, and may provide the packet to the switch device 210 for transmission, e.g. to one of the electronic devices 102, 104, 106, and/or to the content server 112. In one or more implementations, the packets may be buffered in the packetizer buffer 416 before being provided to the switch device 210.

In one or more implementations, in the case of new or unsupported header formats, the headers may be generated by the processor core 224 and stored in a descriptor. The descriptor may subsequently be processed by the TX multichannel processing module 228, and the TX multichannel processing module 228 may provide the headers to the frame assembly module 410. In one or more implementations, pass-through frames may be supported by storing the entire frame, e.g. both header and payload, in the off-chip memory 240, and then passing one or more descriptors to the TX multichannel processing module 228 that point to the header and payload of the pass-through frame.

In one or more implementations, at least a portion of the dynamic header information may be generated by the processor core 224 and included in a descriptor passed to the TX multichannel processing module 228. The TX multichannel processing module 228 may then pass the dynamic header information to the frame assembly module 410. In one or more implementations, the TX multichannel processing module 228 may partition AV payload data into multiple portions that are aligned with Ethernet frames, and may pass each portion to the frame assembly module 410.

In one or more implementations, the frame assembly module 410 may facilitate packet retransmissions by storing payloads for each channel in the ring buffer of the retransmission buffers 422 that corresponds to each channel, and a reference sequence number to the starting address of the retransmission buffers 422 may be updated e.g. in the retransmission sequence number buffer 414. The processor core 224 may monitor received acknowledgment frames and retransmission buffer information and may control when and what amount of retransmission is necessary.

Figure 5:
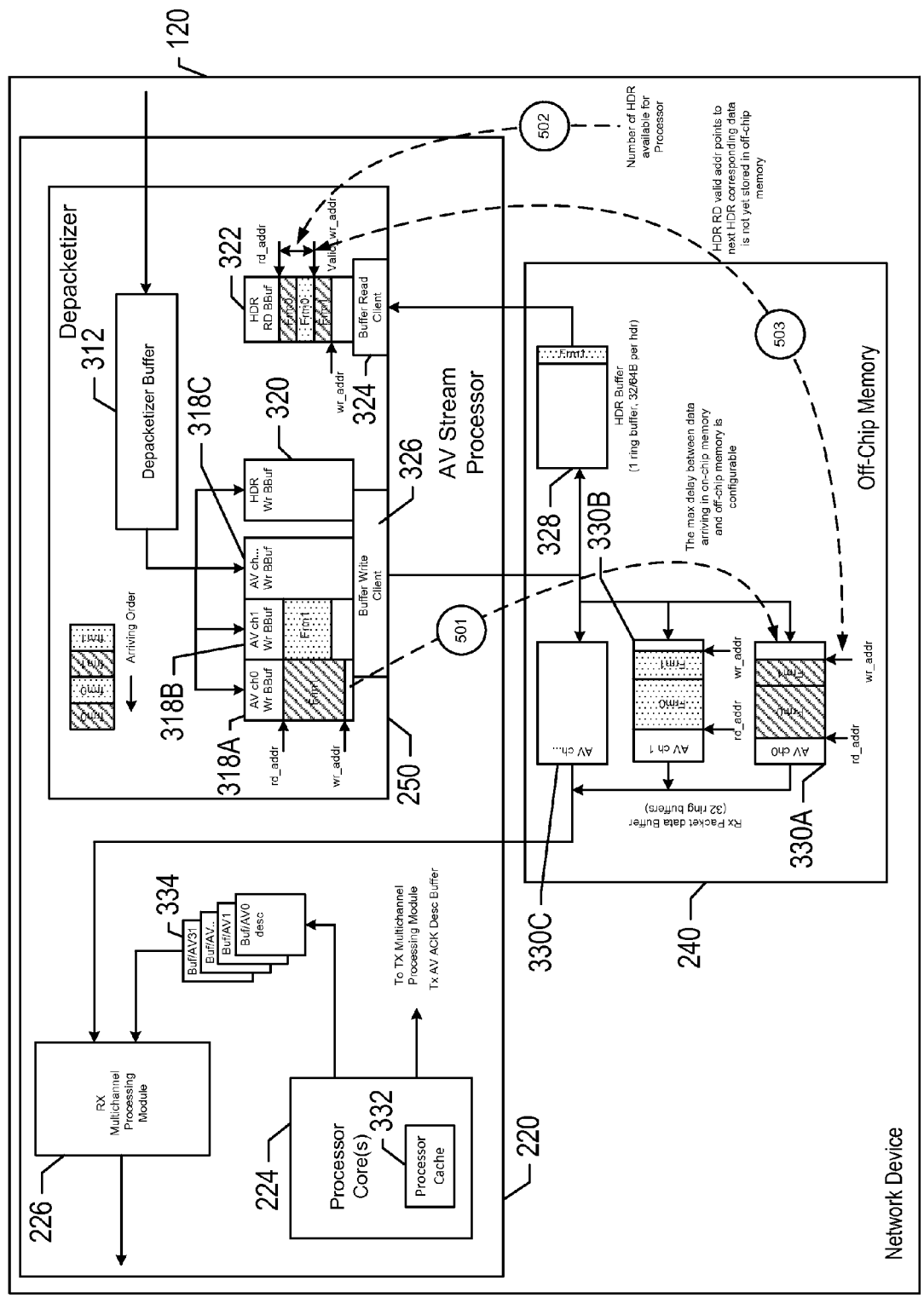
FIG. 5 illustrates an example depacketizer of an example network device implementing a system for efficient memory bandwidth utilization in a network device in accordance with one or more implementations.

FIG. 5 illustrates an example depacketizer 250 of an example network device 120 implementing a system for efficient memory bandwidth utilization in a network device in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network device 120 includes the AV stream processor 220 and the off-chip memory 240. The AV stream processor 220 includes the depacketizer 250, the processor core 224, the RX multichannel processing module 226, and the RX multichannel processing module buffers 334. The depacketizer 250 includes the payload write burst buffers 318A-C, the header write burst buffer 320, the buffer write client 326, the buffer read client 324, the header read burst buffer 322, and the depacketizer buffer 312. The off-chip memory 240 includes the payload buffers 330A-C and header buffer 328. The payload write burst buffer 318A and the payload buffer 330A may correspond to a first channel (e.g., "channel 0"), the payload write burst buffer 318B and the payload buffer 330B may correspond to a second channel (e.g., "channel 1"), and the payload write burst buffer 318C and the payload buffer 330C may correspond to a third channel (e.g., "channel 2").

In operation, multiple payloads are written from the payload write burst buffers 318A-C to the payload buffers 330A-C in single large memory transaction sizes (501), thereby providing efficient memory bandwidth utilization by reducing the number of off-chip memory 240 accesses. The header information items are written from the header write burst buffer 320 to the header buffer 328, e.g. in single large memory transaction sizes, thereby providing efficient memory bandwidth utilization, and then are subsequently read from the header buffer 328 to the header read burst buffer 322. The header read burst buffer 322 may store a number of header information items at any given time (502).

The depacketizer 250 may retrieve a header information item from the header read burst buffer 322, e.g. based at least on the order in which the corresponding packets were received, and may verify that the entire header information item has been stored in the header read burst buffer 322, e.g. a header information item could be split between two bursts. The depacketizer 250 then retrieves, from the header information item, the starting address and size of the corresponding payload stored in the payload buffer, e.g. the payload buffer 330A, in the case of channel 0. The depacketizer 250 then compares the starting address and size of the corresponding payload to the buffer write address of the corresponding payload buffer, e.g. the payload buffer 330A.

If the starting address and size (e.g. the total memory space allocated by the corresponding payload) are equal or behind the write address of the corresponding payload buffer 330A, indicating that the payload has been written to the payload buffer 330A, the header information item is validated (503). However, if the starting address and size are ahead of the write address of the corresponding payload buffer 330A, a valid write address of the header read burst buffer 322 is stalled, thereby preventing any additional header information items from being validated, while additional payloads are written to the payload buffers 330A-C. For example, the processor core 224, or a component providing header information items thereto, may be prevented from advancing a read pointer of the header read burst buffer 322 beyond the validated header information items, e.g. as indicated by the valid write address pointer.

In one or more implementations, the maximum delay from when a packet arrives at the depacketizer 250 until the extracted header information item for the packet is being processed by the processor core 224 may be bounded, since the payloads may be pushed to the off-chip memory 240 if the arriving rate of packets is below a threshold, such as 4 Mbit/s, or generally any threshold. For example, a timer may be initiated when a payload is first stored in one of the payload write burst buffers 318A-C, such as the payload write burst buffer 318A. If the payload is not written to the payload buffer 330A before the timer reaches a timeout value, the payload may be pushed to the payload buffer 330A.

In the example of FIG. 5, two packets have been received for channel 0, the entire payload of the first packet, and a portion of the payload of the second packet being stored in the payload buffer 330A corresponding to channel 0. Similarly, two packets have been received for channel 1, the entire payload of the first packet, and a portion of the payload of the second packet being stored in the payload buffer 330B corresponding to channel 1. The header read burst buffer 322 contains three header information items. Since only the entire payloads that correspond to the first header information item of channel 0 and the first header information item of channel 1 have been written to the payload buffers 330A,B, respectively, only the first header information item for channel 0 and the first header information item for channel 1 pass the data coherence verification. The entire payload for the second header information item of channel 0 has not yet been stored in the payload buffer 330A, and therefore second header information item of channel 0 does not pass the data coherence verification. Thus, the valid write address pointer points to the end of the first header information item of channel 1, which is before the first header information item that fails the data coherence verification, e.g. the second header information item of channel 0.

Figure 6:
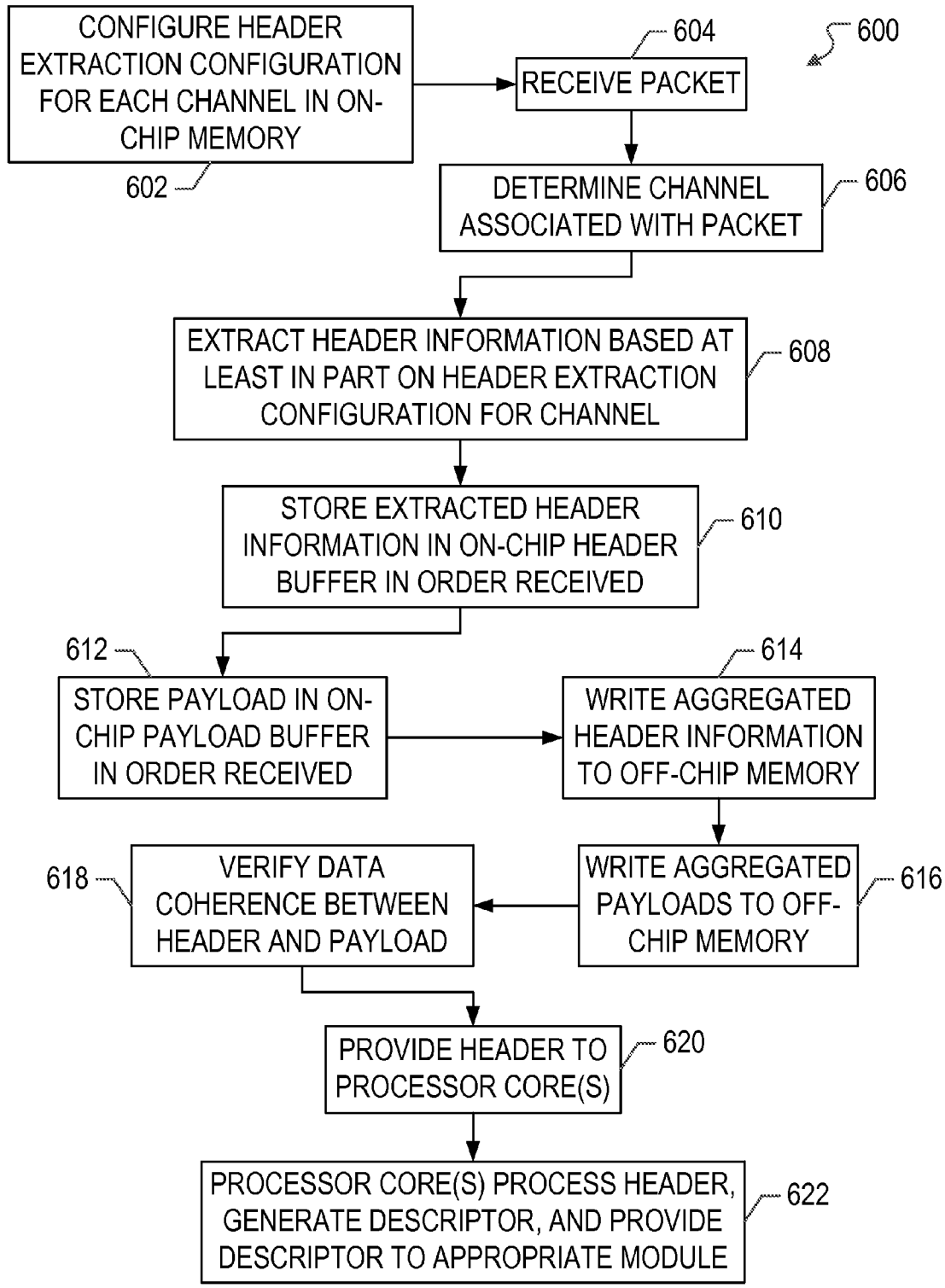
FIG. 6 illustrates a flow diagram of an example process for depacketizing by an example network device implementing a system for efficient memory bandwidth utilization in a network device in accordance with one or more implementations.

FIG. 6 illustrates a flow diagram of an example process 600 for depacketizing by an example network device 120 implementing a system for efficient memory bandwidth utilization in a network device in accordance with one or more implementations. For explanatory purposes, the example process 600 is described herein with reference to the network device 120 of FIGS. 1-5; however, the example process 600 is not limited to the network device 120 of FIGS. 1-5, and the example process 600 may be performed by one or more components of the network device 120. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

The processor core 224 stores header extraction configuration information for each channel in the channel configuration buffer 314 (602). The packet processor 310 of the depacketizer 250 receives a packet, e.g. from the switch device 210 (604). The packet processor 310 determines the channel associated with the packet, e.g. based on a tag included with the header of the packet, a destination address associated with the packet, and/or a source address associated with the packet (606). The packet processor 310 retrieves the header extraction configuration information that corresponds to the determined channel from the channel configuration buffer 314, and the packet processor 310 extracts at least a portion of the header from the received packet based at least in part on the header extraction configuration information (608).

The packet processor 310 stores the extracted header information, and any additional header information, such as information for accessing the corresponding payload in the off-chip memory 240, in the on-chip header write burst buffer 320 as a header information item (610). The packet processor 310 also stores the corresponding payload in the on-chip payload write burst buffers 318 (612). The buffer write client 326 writes aggregated header information items to the header buffer 328 of the off-chip memory 240, e.g. in single large memory transaction sizes (614), thereby providing efficient memory bandwidth utilization by reducing the number of off-chip memory 240 accesses. The buffer write client 326 also writes aggregated payloads to the payload buffers 330 of the off-chip memory 240, e.g. in single large memory transaction sizes (616), thereby providing efficient memory bandwidth utilization by reducing the number of off-chip memory 240 accesses. In one or more implementations, the buffer write client 326 may write partial payloads and/or partial header information items to the off-chip memory 240 as part of a single memory transaction, e.g. a single burst.

The depacketizer 250 verifies the data coherence between a header information item stored in the header read burst buffer 322 and the corresponding payload (618). If the payload corresponding to a header information item being read from the header read burst buffer 322 is stored in the off-chip memory 240, the header information item is provided to, and/or read by, the processor core 224 (620). The processor core 224 processes one or more header information items, generates a descriptor for the one or more header information items, and provides the descriptor to the RX multichannel processing module 226 and/or the TX multichannel processing module 228 (622).

Figure 7:
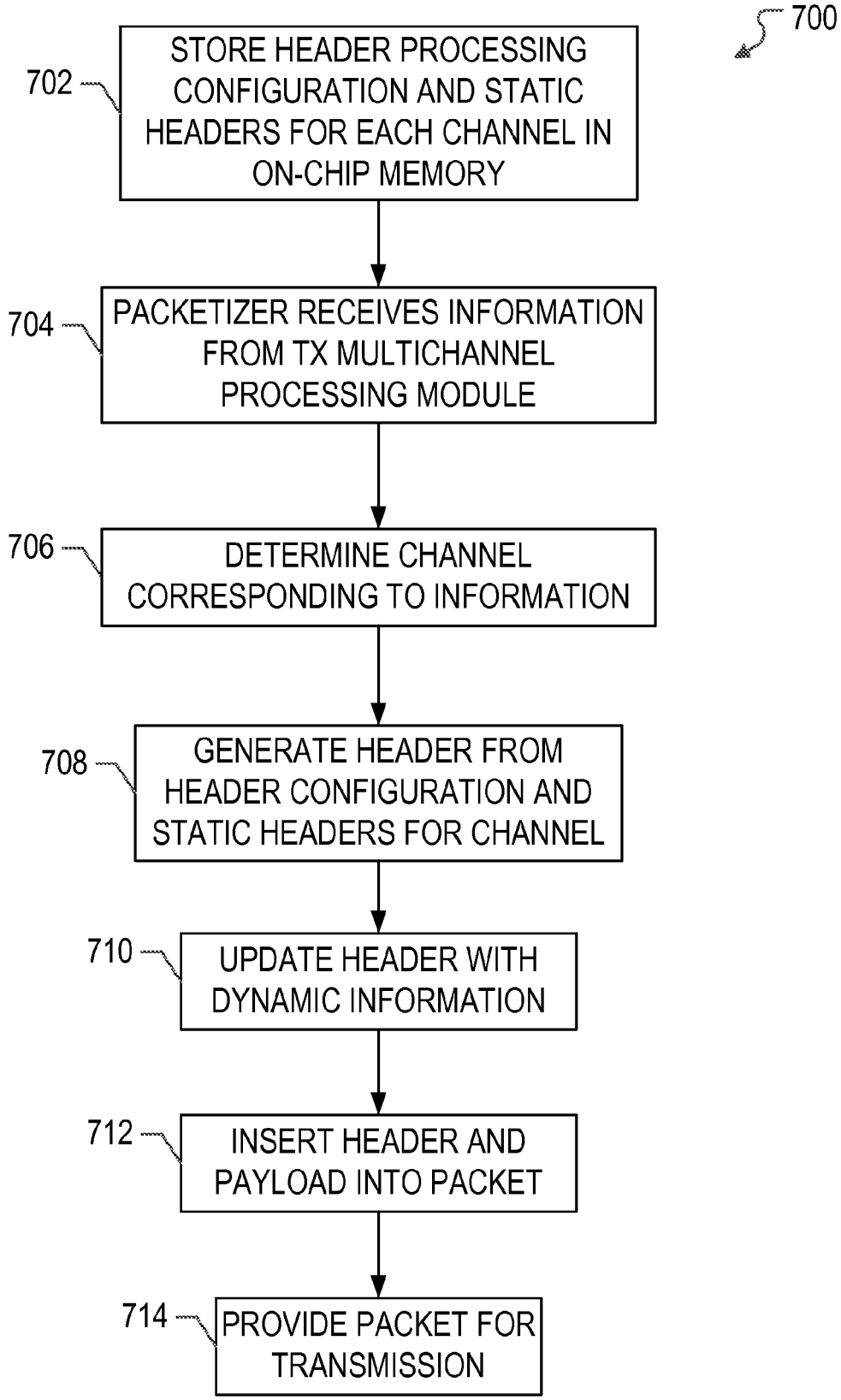
FIG. 7 illustrates a flow diagram of an example process for packetizing by an example network device implementing a system for efficient memory bandwidth utilization in a network device in accordance with one or more implementations.

FIG. 7 illustrates a flow diagram of an example process 700 for packetizing by an example network device 120 implementing a system for efficient memory bandwidth utilization in a network device in accordance with one or more implementations. For explanatory purposes, the example process 700 is described herein with reference to the network device 120 of FIGS. 1-5; however, the example process 700 is not limited to the network device 120 of FIGS. 1-5, and the example process 700 may be performed by one or more components of the network device 120. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The processor core 224 stores header processing information and/or static headers for each channel in the on-chip channel configuration buffer 420 (702). The frame assembly module 410 of the packetizer 260 receives information from the TX multichannel processing module 228, such as a payload, partial header information, acknowledgment information, etc. (704). The frame assembly module 410 of the packetizer 260 determines the channel corresponding to the information, e.g. based at least on a tag associated with the information, such as a tag appended to the information (706). The frame assembly module 410 of the packetizer 260 generates, on-chip, a header corresponding to the information from any static headers for the channel that are stored in the channel configuration buffer 420 (708). The frame assembly module 410 of the packetizer 260 updates the header with dynamic header information, such as sequence number, payload size, etc. (710). In one or more implementations, at least a portion of the dynamic header information may be included in the information provided by the TX multichannel processing module 228. Thus, the frame assembly module 410 generates the header on-chip and without accessing the off-chip memory 240, thereby providing efficient memory bandwidth utilization.

The frame assembly module 410 of the packetizer 260 inserts the header and a corresponding payload, e.g. as received from the TX multichannel processing module 228, into a packet, e.g. an Ethernet frame (712). The frame assembly module 410 of the packetizer 260 provides the packet to the switch device 210 for transmission, e.g. to one of the electronic devices 102, 104, 106, or the content server 112 (714).

Figure 8:
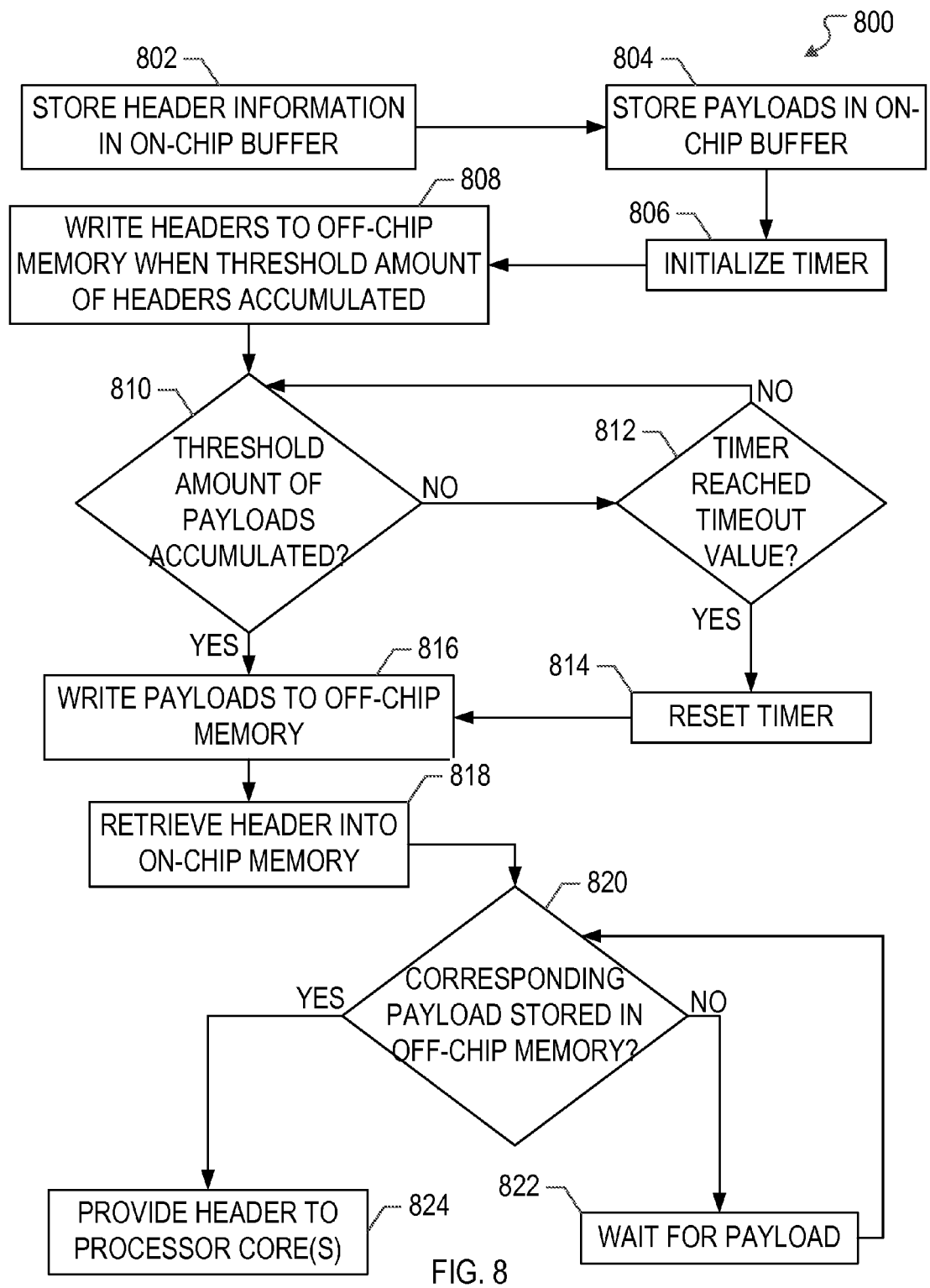
FIG. 8 illustrates a flow diagram of an example process for data coherence verification by an example network device implementing a system for efficient memory bandwidth utilization in a network device in accordance with one or more implementations.

FIG. 8 illustrates a flow diagram of an example process 800 for data coherence verification by an example network device 120 implementing a system for efficient memory bandwidth utilization in a network device in accordance with one or more implementations. For explanatory purposes, the example process 800 is described herein with reference to the network device 120 of FIGS. 1-5; however, the example process 800 is not limited to the network device 120 of FIGS. 1-5, and the example process 800 may be performed by one or more components of the network device 120. Further for explanatory purposes, the blocks of the example process 800 are described herein as occurring in serial, or linearly. However, multiple blocks of the example process 800 may occur in parallel. In addition, the blocks of the example process 800 need not be performed in the order shown and/or one or more of the blocks of the example process 800 need not be performed.

The packet processor 310 of the depacketizer 250 stores header information items in the on-chip header write burst buffer 320 (802). The packet processor 310 stores payloads in the on-chip payload write burst buffers 318 (804). The packet processor 310 initializes a timer for each of the payload write burst buffers 318, upon storing a payload in each of the payload write burst buffers 318 (806). The buffer write client 326 writes multiple header information items to the off-chip memory 240 in a single large sized memory transaction, thereby providing efficient memory bandwidth utilization, when a threshold amount of header information items have been accumulated in the header write burst buffer 320 (808). The threshold amount may be configured to any amount, but may generally be set to minimize the number of accesses to the off-chip memory 240. The threshold amount may be based on a number of header information items accumulated and/or based on an amount of bytes of header information items accumulated.

The buffer write client 326 determines whether a threshold amount of payloads have been accumulated for one or more of the payload buffers 318 (810). The threshold amount may be configured to any amount, but may generally be set to minimize the number of accesses to the off-chip memory 240. The threshold amount may be based on a number of payloads accumulated and/or based on an amount of bytes of payloads accumulated. The threshold amount may be configured on a per channel basis, or may be configured across multiple channels. If the buffer write client 326 determines that the threshold amount of the payloads have not been accumulated (810), the depacketizer 250 determines whether the timer corresponding to any of the channels has reached a timeout value (812). If the timer corresponding to any of the channels has not reached the timeout value (812), the buffer write client 326 continues to wait for a threshold amount of payloads to be accumulated (810).

If the timer corresponding to any of the channels has reached the timeout value (812), the depacketizer 250 resets the timer (814), and the buffer write client 326 writes at least one payload for the channel corresponding to the timer to the off-chip memory 240 (816). Similarly, when the buffer write client 326 determines that the threshold amount of payloads have been accumulated (810), the buffer write client 326 writes multiple payloads to the off-chip memory 240 in a single large memory transaction size (816), thereby providing efficient memory bandwidth utilization.

The buffer read client 324 retrieves multiple header information items from the off-chip memory 240 in a single large memory transaction size, thereby providing efficient memory bandwidth utilization, and writes the one or more header information items to the header read burst buffer 322. The depacketizer 250 reads the first header information item from the header read burst buffer 322, e.g. based at least on the order that the corresponding packets were received (818). The depacketizer 250 determines whether the payload corresponding to the header information item has been written to the off-chip memory 240 based at least on the information for accessing the payload in the off-chip memory 240 that is included in the header information item (820). For example, the depacketizer 250 may utilize the size of the payload and the starting address of the payload in the off-chip memory 240 to determine whether the payload has been written to the off-chip memory 240, e.g. based on the write address of the corresponding ring buffer in the off-chip memory 240.

If the depacketizer 250 determines that the payload has not been written to the off-chip memory 240 (820), the depacketizer 250 waits for the payload to be written to the off-chip memory 240 (822). If the depacketizer 250 determines that the payload has been written to the off-chip memory 240 (820), the depacketizer 250 provides the header information item to the processor core 224 for processing, e.g. by writing the header information item to the processor cache 332, and/or the processor core 224, or a component in communication therewith, is allowed to read the header information item from the header read burst buffer 322 (824).

Figure 9:
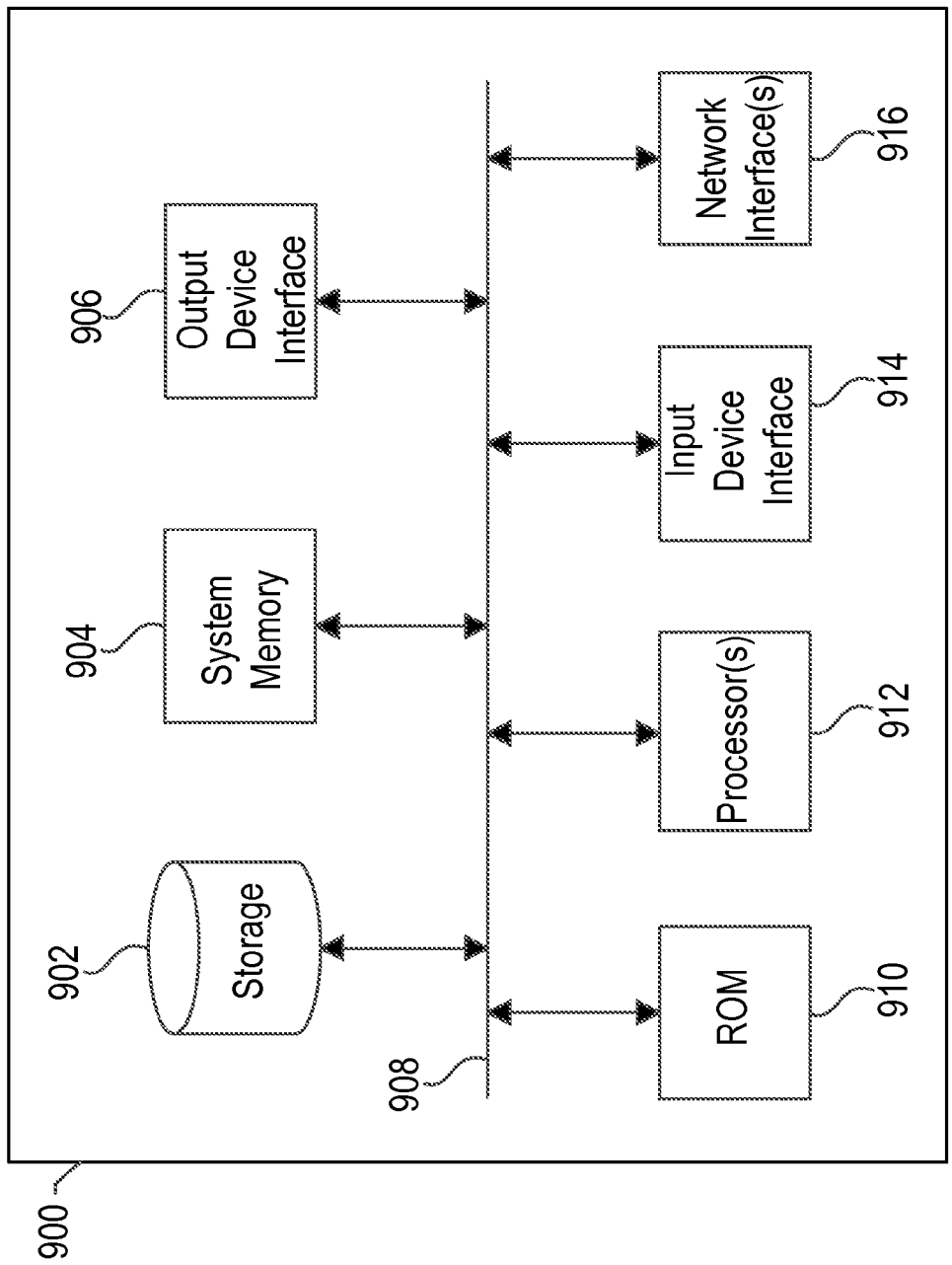
FIG. 9 conceptually illustrates an electronic system with which one or more implementations of the subject technology may be implemented.

FIG. 9 conceptually illustrates an electronic system 900 with which one or more implementations of the subject technology may be implemented. The electronic system 900, for example, can be a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 900 can be, and/or can be a part of, the network device 120, and/or one or more of the electronic devices 102, 104, 106. Such an electronic system includes various types of computer readable media and interfaces for various other types of computer readable media. The electronic system 900 includes a bus 908, one or more processor(s) 912, such as the AV stream processor 220 and/or the host processor 230, a system memory 904 or buffer, a read-only memory (ROM) 910, a permanent storage device 902, an input device interface 914, an output device interface 906, and one or more network interface(s) 916, or subsets and variations thereof.

The bus 908 collectively represents all system, peripheral, and chipset buses that communicatively connect the numerous internal devices of the electronic system 900. In one or more implementations, the bus 908 communicatively connects the one or more processor(s) 912 with the ROM 910, the system memory 904, and the permanent storage device 902. From these various memory units, the one or more processor(s) 912 retrieve instructions to execute and data to process in order to execute the processes of the subject disclosure. The one or more processor(s) 912 can be a single processor or a multi-core processor in different implementations.

The ROM 910 stores static data and instructions that are needed by the one or more processor(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processor(s) 912 may need at runtime. In one or more implementations, the processes of the subject disclosure are stored in the system memory 904, the permanent storage device 902, and/or the ROM 910. From these various memory units, the one or more processor(s) 912 retrieve instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 9, bus 908 also couples electronic system 900 to one or more networks (not shown), one or more electronic devices 102, 104, 106, and/or content server 112, through one or more network interface(s) 916. One or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 900 can be a part of one or more networks of computers (such as a local area network ("LAN"), a wide area network ("WAN"), or an Intranet, or a network of networks, such as the Internet. Any or all components of electronic system 900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A network traffic processor comprising:
    a processor core configured to process packets associated with one or more channels based at least on corresponding header information items;
    a depacketizer that is configured to:
       receive the packets associated with the one or more channels, wherein each of the packets comprises a header and a payload;
       extract at least a portion of each of the headers to generate header information items, wherein each header information item comprises sufficient information for processing the corresponding packet by the processor core using the header information item;
       accumulate multiple of the payloads of multiple of the packets associated with a same channel of the one or more channels until a threshold size is reached and write the multiple of the payloads to off-chip memory in a single memory transaction when the threshold size is reached;
       provide the header information items to the processor core, in an order that the corresponding packets were received, and after verifying that the corresponding payloads have been written to the off-chip memory;
       determine whether at least one of the corresponding payloads has not been verified as having been written to the off-chip memory; and
       wait, until the at least one of the corresponding payloads has been verified as having been written to the off-chip memory before providing any additional header information items to the processor core when the at least one of the corresponding payloads has not been verified as having been written to the off-chip memory.

2. The network traffic processor of claim 1, wherein the processor core is further configured to:
    process the packets associated with the one or more channels based at least on the corresponding header information items and without accessing the corresponding payloads from the off-chip memory.

3. The network traffic processor of claim 1, wherein the depacketizer is further configured to:
    accumulate multiple of the header information items corresponding to the packets associated with the one or more channels until the threshold size is reached and write the multiple of the header information items to the off-chip memory in another single memory transaction when the threshold size is reached.

4. The network traffic processor of claim 1, wherein the off-chip memory comprises one or more ring buffers associated with the one or more channels for storing the payloads of each of the one or more channels and another ring buffer for storing the header information items.

5. The network traffic processor of claim 4, further comprising a transmit multichannel processing circuit and a packetizer, wherein:
    the processor core is configured to generate a descriptor for accessing multiple payloads corresponding to one of the channels that are stored continuously in the ring buffer associated with the one of the channels, and to provide the descriptor to the transmit multichannel processing circuit;

the transmit multichannel processing circuit is configured to receive the descriptor, to retrieve the multiple payloads from the ring buffer associated with the one of the channels, in another single memory transaction, and to provide the multiple payloads to the packetizer; and the packetizer is configured to generate one of more packets for the multiple payloads and to provide the one or more packets for transmission to an electronic device associated with the one of the channels.

6. The network traffic processor of claim 1, wherein each of the header information items further comprises memory location information for accessing each of the corresponding payloads from the off-chip memory and the depacketizer is further configured to:

retrieve each of the header information items from the off-chip memory; and verify that each of the corresponding payloads has been written to the off-chip memory based at least on the memory location information of each of the header information items.

7. The network traffic processor of claim 6, further comprising an on-chip memory, wherein the processor core is configured to:

retrieve, from the depacketizer, multiple of the header information items;

generate a descriptor for accessing multiple of the payloads corresponding to the multiple of the header information items from the off-chip memory based at least on the memory location information of the multiple of the header information items, wherein the descriptor comprises a starting address associated with a first payload of the multiple of the payloads and a total size of the multiple of the payloads; and store the descriptor in the on-chip memory.

8. The network traffic processor of claim 7, further comprising a receive multichannel processing circuit that is configured to:

receive the descriptor from the on-chip memory;

retrieve the multiple of the payloads from the off-chip memory, in another single memory transaction, based at least on the descriptor; and process the multiple of the payloads.

9. The network traffic processor of claim 1, further comprising a transmit multichannel processing circuit and a packetizer, wherein:

the processor core is configured to receive one of the header information items, generate a descriptor that comprises acknowledgment information for the one of the packets corresponding to the one of the header information items, and provide the descriptor to the transmit multichannel processing circuit;

the transmit multichannel processing circuit is configured to append a tag to the descriptor that is indicative of the one of the channels associated with the one of the packets and provide the descriptor to the packetizer; and the packetizer is configured to generate an acknowledgement packet, without accessing the off-chip memory, and based at least on the descriptor and the one of the channels indicated by the appended tag, and to provide the acknowledgment packet for transmission to an electronic device associated with the one of the channels indicated by the appended tag.

10. The network traffic processor of claim 1, wherein the depacketizer comprises an on-chip memory and the processor core is further configured to:

write, prior to the packets being received by the depacketizer and in the on-chip memory of the depacketizer, configuration information for extracting the at least the portion of each of the headers to generate the header information items.

11. The network traffic processor of claim 10, wherein the depacketizer is further configured to:

retrieve the configuration information from the on-chip memory prior to extracting the at least the portion of each of the headers to generate the header information items; and extract the at least the portion of each of the headers to generate the header information items based at least on the configuration information.

12. The network traffic processor of claim 1, wherein the packets comprises audio video (AV) traffic, the network traffic processor is configured to exclusively process the AV traffic, and the processor core and the depacketizer comprise hardware circuits.

13. The network traffic processor of claim 1, further comprising:

a packetizer configured to:

receive payload information for a packet to be transmitted, wherein the payload information is associated with a channel of the one or more channels;

instructions to retrieve, from on-chip memory, a static header for the packet to be transmitted based at least on the channel of the one or more channels associated with the payload information, wherein the static header is retrieved from the on-chip memory for each payload information associated with the channel of the one or more channels prior to inserting the static header into the packet to be transmitted;

instructions to determine additional header information based at least on the channel of the one or more channels associated with the payload information and for modifying the static header to include the additional header information;

instructions to insert the modified static header and a payload corresponding to the payload information into the packet to be transmitted; and instructions to provide the packet to be transmitted for transmission to an electronic device associated with the channel.

14. The network traffic processor of claim 13, wherein the packetizer is further configured to:

write, to the on-chip memory and prior to receiving the payload information for the packet to be transmitted, the static header for the packet to be transmitted and configuration information for determining the additional header information for the channel of the one or more channels.

15. The network traffic processor of claim 13, wherein the packetizer is further configured to:

retrieve, from the on-chip memory, the configuration information for the channel of the one or more channels; and determine the additional header information based at least in part on the configuration information for the channel of the one or more channels.

16. The network traffic processor of claim 13, wherein the packet to be transmitted comprises an acknowledgment packet, the payload information comprises a descriptor containing an acknowledgment number, and the packetizer is further configured to:

insert the modified static header and the acknowledgment number into the acknowledgment packet.

17. A method comprising:
receiving exclusively audio video (AV) traffic comprising a plurality of packets associated with a plurality of channels, wherein the plurality of packets comprise a plurality of headers and a plurality of payloads;
storing the plurality of payloads in a plurality of physical on-chip memory buffers associated with the plurality of channels, wherein each of the plurality of payloads is stored in one of the plurality of physical on-chip memory buffers associated with one of the plurality of channels associated with each of the plurality of payloads;
initiating, for each of the plurality of physical on-chip memory buffers, a timer upon storing at least one of the plurality of payloads in each of the plurality of physical on-chip memory buffers; and
writing the plurality of payloads stored in each of the plurality of physical on-chip memory buffers to an off-chip memory when an amount of the plurality of payloads stored in each of the plurality of physical on-chip memory buffers reaches a threshold value and when the timer for each of the plurality of physical on-chip memory buffers reaches a timeout value prior to the amount of the plurality of payloads stored in each of the plurality of physical on-chip memory buffers reaching the threshold value, wherein the timeout value is set for each respective physical on-chip memory buffer of the plurality of physical on-chip memory buffers based at least in part on a duration of time from when a packet for each respective associated channel of the of the plurality of associated channels is received until extracted header information item for the packet is processed.

18. The method of claim 17, further comprising:
extracting a plurality of headers and the plurality of payloads from the plurality of packets; and
generating a plurality of header data structures from the plurality of headers and storing the plurality of header data structures in the off-chip memory, wherein each of the plurality of header data structures comprises at least a portion of each of the plurality of headers and memory location information for retrieving a corresponding payload of the plurality of payloads from the off-chip memory.

19. The method of claim 18, wherein each of the plurality of payloads stored in each of the plurality of physical on-chip memory buffers is written to the off-chip memory based at least in part on the memory location information stored in each corresponding header data structure of the plurality of header data structures.

20. A computer program product comprising instructions stored in a non-transitory computer-readable storage medium, the instructions comprising:
instructions to receive exclusively audio video (AV) traffic comprising a plurality of packets associated with a plurality of channels, wherein the plurality of packets comprise a plurality of headers and a plurality of payloads;
instructions to store the plurality of payloads in a plurality of physical on-chip memory buffers associated with the plurality of channels, wherein each of the plurality of payloads is stored in one of the plurality of physical on-chip memory buffers associated with one of the plurality of channels associated with each of the plurality of payloads;
instructions to initiate, for each of the plurality of physical on-chip memory buffers, a timer upon storing at least one of the plurality of payloads in each of the plurality of physical on-chip memory buffers; and
instructions to write the plurality of payloads stored in each of the plurality of physical on-chip memory buffers to an off-chip memory when an amount of the plurality of payloads stored in each of the plurality of physical on-chip memory buffers reaches a threshold value and when the timer for each of the plurality of physical on-chip memory buffers reaches a timeout value prior to the amount of the plurality of payloads stored in each of the plurality of physical on-chip memory buffers reaching the threshold value, wherein the timeout value is set for each respective physical on-chip memory buffer of the plurality of physical on-chip memory buffers based at least in part on a duration of time from when a packet for each respective associated channel of the of the plurality of associated channels is received until extracted header information item for the packet is processed.

21. The computer program product of claim 20, wherein the instructions further comprise:
instructions to extract a plurality of headers and the plurality of payloads from the plurality of packets; and
instructions to generate a plurality of header data structures from the plurality of headers and storing the plurality of header data structures in the off-chip memory, wherein each of the plurality of header data structures comprises at least a portion of each of the plurality of headers and memory location information for retrieving a corresponding payload of the plurality of payloads from the off-chip memory, wherein each of the plurality of payloads stored in each of the plurality of physical on-chip memory buffers is written to the off-chip memory based at least in part on the memory location information stored in each corresponding header data structure of the plurality of header data structures.

* * * * *